United States Patent [19]

Kluth

[11] Patent Number: 5,077,616
[45] Date of Patent: Dec. 31, 1991

[54] VIDEO RECORDER WITH INCREASED BANDWIDTH RECORDING

[75] Inventor: Hans-Jürgen Kluth, VS-Villingen, Fed. Rep. of Germany

[73] Assignee: Deutsche Thomson-Brandt GmbH, Villingen-Schwenningen, Fed. Rep. of Germany

[21] Appl. No.: 250,552

[22] Filed: Sep. 29, 1988

[30] Foreign Application Priority Data

Sep. 29, 1987 [DE] Fed. Rep. of Germany ....... 3732734

[51] Int. Cl.$^5$ .............................................. H04N 9/80
[52] U.S. Cl. .................................................. 358/330
[58] Field of Search ...................... 358/12, 14, 15, 16, 358/310, 330, 343; 360/19.1

[56] References Cited

U.S. PATENT DOCUMENTS

| | | | |
|---|---|---|---|
| 4,001,875 | 1/1977 | Le Parquier | 358/330 |
| 4,477,840 | 10/1984 | Kluth | 358/330 |
| 4,589,011 | 5/1986 | Rzeszewski | 358/12 |
| 4,622,578 | 11/1986 | Rzeszewski | 358/12 |
| 4,641,179 | 2/1987 | LoCicero et al. | 358/12 |
| 4,661,863 | 9/1987 | Ichinoi | |
| 4,695,899 | 9/1987 | Nagano et al. | |
| 4,879,606 | 11/1989 | Walter et al. | 358/330 |

FOREIGN PATENT DOCUMENTS

| | | |
|---|---|---|
| 76047 | 8/1986 | European Pat. Off. . |
| 2948518 | 6/1981 | Fed. Rep. of Germany . |
| 3238506 | 4/1983 | Fed. Rep. of Germany . |
| 162241 | 12/1970 | New Zealand . |
| 1058604 | 2/1967 | United Kingdom . |
| 2101835 | 1/1983 | United Kingdom ........ 358/16 |
| 2108804 | 5/1983 | United Kingdom . |

OTHER PUBLICATIONS

*Funkschau*, 1969, vol. 17, pp. 575–578.
*Nachrichtentechnik*, 2nd Edition, by Karl Steinbuch and Werner Rupprecht, Berlin, Springer-Verlag, 1973, pp. 278–281.
*Telefunken-Zeitung*, Special Edition, Jun. 1966, "The Influence of Luminance in Transients on Coloured Areas and Colour Transitions when Associated with Vestigial Sideband Transmission and Reception", by W. Bruch, pp. 8.1–8.11.
*Principles of Domestic Video Recording Playback Systems*, by K. Shipman, published 1988, pp. 52 & 170–188.
*Television and Video Engineer's Pocket Book*, by E. Trundle, published 1987, FIG. 1.4.
U.S. Patent Application Serial Number 242836, filed Sep. 12, 1988, Burchard Schmidtmann, et al., entitled Video Recorder with Increased Bandwidth Recording.

Primary Examiner—Donald McElheny, Jr.
Attorney, Agent, or Firm—Joseph S. Tripoli; Joseph J. Laks

[57] ABSTRACT

A luminance signal is frequency modulated with an FM carrier to generate a frequency modulated signal having a frequency spectrum within a frequency band of 1.6 to 8 megahertz. A second signal such as a line sequential color signal is single sideband modulated with a second carrier to generate a second modulated signal having a frequency spectrum in the form of a single sideband to one side of the second carrier that is located in a frequency band outside of the frequency band of the frequency modulated signal in a region that is generally empty of frequencies belonging to the frequency modulated signal. The single sideband may be the lower sideband between 0–1.2 megahertz. The two modulated signals are then recorded on a magnetic tape.

21 Claims, 9 Drawing Sheets

VIDEO RECORDER WITH INCREASED BANDWIDTH RECORDING

This invention relates to a video recorder with increased bandwidth recording.

BACKGROUND

The luminance signal of a video recorder may be recorded by frequency modulation of a carrier, which may result in a frequency spectrum having, for example, a frequency range of 1.3 to 6 megahertz. During recording, the chrominance signal, which is a modulated color carrier signal, is converted by a mixing carrier to a modified color carrier signal, reduced in carrier frequency to about 627 kilohertz. The down-converted signal is recorded in the free or vacant frequency range below the frequency spectrum of the FM carrier that is modulated with the luminance signal. This vacant frequency range amounts to 1 megahertz, and thus a bandwidth of 0.5 megahertz is available for conventional color signal recording.

An improved recording system is known, such as Super VHS or S-VHS, in which a greater frequency modulation range and a greater total bandwidth of the spectrum is achieved by recording on magnetic tape having improved magnetic film characteristics and by using a greater magnetizing current for the FM carrier. By means of this system, the baseband bandwidth of the recorded luminance signal is increased to about 5 megahertz, and, in addition, the signal-to-noise ratio is increased.

The bandwidth of the recorded color signals remains the same for the S-VHS system, because, for reasons of compatibility, only the vacant frequency range of 0 to 1.2 megahertz below the frequency spectrum of the FM carrier is available for recording the color carrier. This has the disadvantage that the sharpness or definition and the signal-to-noise ratio for the recorded color signals have not been improved.

A feature of the invention, therefore, is to improve the bandwidth of video signals, such as color signals, and thus improve the quality of reproduction in a video recorder, without having to increase the available frequency range outside the frequency band associated with the FM carrier.

SUMMARY OF THE INVENTION

A video signal is frequency modulated with an FM carrier to generate a frequency modulated signal having a first frequency spectrum in a first frequency band. A second signal such as a chrominance signal is modulated with a second carrier to generate a second modulated signal having a second frequency spectrum in the form of a single sideband to one side of the second carrier that is located in a second frequency band outside the first frequency band in a region that is generally empty of frequencies belonging to the frequency modulated signal. The two modulated signals are then recorded on a magnetic tape.

In accordance with another feature of the invention, to reduce the prominence or visual effects of crosstalk pickup, one of the two modulated signals is time-shifted prior to recording so as to align in a particular manner a given recorded line in a given recorded track with first and second corresponding recorded lines of two adjacent recorded tracks. The particular alignment results in a given playback line of a playback signal and corresponding first and second simultaneously generated crosstalk lines from first and second crosstalk signals picked up during playback representing respectively a first display line that is associated with a first location on a viewing screen of a display device and second and third display lines associated with second and third locations that are spatially separated from the first location, equally above and below. Using a different particular alignment, color crosstalk components of the same type may be picked up, where the chrominance signal is recorded as a line sequential color difference signal.

Utilizing the single sideband method in accordance with the invention has several advantages. The limited free frequency band of approximately 1.0 megahertz below the frequency spectrum of the frequency modulated luminance signal may be fully exploited for the bandwidth of the recorded color signals. The baseband color signal bandwidth approximately equals the total width of the free frequency band, i.e. 1.0 megahertz.

The single sideband method involves recording without e.g. the upper sideband and recording without the color carrier. For reasons similar to those associated with quadrature modulation recording, single sideband recording may result in considerable single side band errors that may arise in the form of crosstalk and picture interference at color transitions. To reduce the effects of such single band errors, it is advantageous in according with another aspect of the invention to single sideband record the two color signals, such as the U, V color difference signals, in such a way that crosstalk between the two types of color difference signals is excluded. In particular a line sequential color difference recording technique may be used.

In some already existing color transmission methods, for example, in SECAM and D2-MAC, the procedure of line sequential transmission of the two color difference signals is performed in such a way that the inventive single side band recording technique does not produce significant or prominent crosstalk interference. In the case of PAL color TV signals, where the two color difference signals are transmitted simultaneously each line, line sequential recording of the two color difference signals produces a reduction in vertical resolution compare to the vertical resolution in the original PAL color signals.

The reduction in vertical reduction is not visually objectionable because vertical resolution is typically higher than horizontal resolution, and reducing the vertical resolution by sequential recording merely brings the vertical resolution down in line with the horizontal resolution. This is evidenced by the fact that the vertical resolution has already been decreased in typical VHS recording due to the use of a comb filter in the color playback processing channel for chroma crosstalk elimination. The comb filter has the effect of averaging over several lines, thereby producing the reduction in vertical reduction.

Advantageously, by using single sideband recording techniques the capability of doubling the bandwidth of the recorded color signal produces an increase in picture sharpness in the reproduced color signal. When single sideband recording is used in conjunction with line sequential color processing prior to recording, no noticeable decrease in vertical resolution is observed.

In accordance with an additional feature of the invention, the sequential recording of two color difference signals is done in such a way that crosstalk between the two color difference signals is avoided.

In accordance with another aspect of the invention, the color difference signals are recorded in such a way that the conventional color-under recording and playback circuits are for the most part utilizable when recording and playing back a single sideband signal. The single sideband signal may be processed similarly to a quadrature modulated color carrier signal with regard to modulation and frequency conversion. For the single sideband recording technique to be used in accordance with the invention, it is merely necessary to change the frequency of the mixing oscillators that frequency translate the color signal during record and playback.

The single sideband technique is also upwardly compatible with known color recording techniques such as VHS color-under recording. This is so because the single sideband signal may be recorded in the same free frequency band that is utilized by the conventional quadrature modulated, narrow bandwidth AM modulated color signal. The upward compatibility enables a video recorder that uses the single sideband modulation technique to record and play back a conventional quadrature modulated color-under signal with only a minor reconfiguring of the color processing circuitry.

In accordance with a different aspect of the invention, by using a line sequential color recording technique, crosstalk between the color signals and adjacent tracks is so low that the conventional comb filter crosstalk elimination circuits need no longer be used.

During playback at the slower speeds, when a transducer or video head reads a given track, the two adjacent tracks are also read because the width of the head is greater than the width of the tracks. Azimuth losses, effective for preventing crosstalk pickup of the frequency modulated luminance signal, is generally ineffective in the frequency range below 2 megahertz.

In accordance with another aspect of the invention, the position of recorded lines in the oblique tracks of the signals recorded on magnetic tape is modified or rearranged compared with the position of recorded lines in e.g. conventional VHS video recorders. By applying an appropriate signal delay prior to sequential recording, the position of recorded lines in one track relative to recorded lines in the adjacent tracks is rearranged such that the visibility of crosstalk from recorded lines in adjacent tracks is substantially reduced.

In carrying out this aspect of the invention, the signals to be recorded are time shifted in such a manner prior to recording that in the reproduced picture a symmetry of crosstalk results. This means that when reading a track of interest, the two adjacent tracks, that are also simultaneously read, contain picture information for display in display lines of the screen having approximately the same spatial separation from the display line associated with the track of interest. This resorting or rearranging of recorded lines of a signal recorded in oblique tracks of a magnetic tape and the resultant crosstalk symmetry reduces the visual effects of crosstalk in the picture.

In accordance with another technique for carrying out the invention, the signals to be recorded are further time shifted to such an extent that in adjacent tracks only color signals of the same type, i.e. only U or V type signals, are recorded next to each other in adjoining lines. Any crosstalk pickup that does occur is then advantageously limited to pickup of only color signals of the same type.

BRIEF DESCRIPTION OF THE DRAWING

FIG. 3b illustrates the display line positional configuration on a viewing screen of a display device of the numbered video lines of a video source subject to recording and playback in accordance with the recording positions illustrated in FIG. 3a;

FIG. 3c illustrates oblique recorded tracks on a magnetic tape and the position within the recorded tracks of the numbered video lines having the recording positions shown in FIG. 3a;

FIG. 4b illustrates the display line positional configuration on a viewing screen of a display device of the numbered video lines of a video source subject to recording and playback in accordance with the recording positions illustrated in FIG. 4a;

FIG. 5b illustrates the display line positional configuration on a viewing screen of a display device of the numbered video lines of a video source subject to recording and playback in accordance with the recording positions illustrated in FIG. 5a;

FIG. 6 illustrates in block diagram form circuitry for producing the recorded line positioning illustrated in FIG. 4a;

FIG. 7 illustrates in block diagram form circuitry for producing the recorded line positioning illustrated in FIG. 5a;

DETAILED DESCRIPTION OF THE INVENTION

Figure 1:
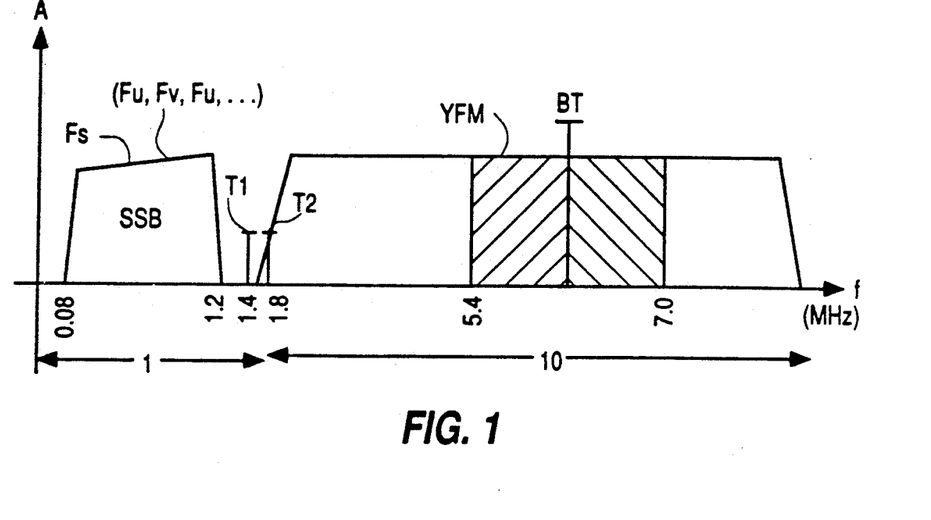
FIG. 1 illustrates the frequency spectrum of a videotape recorded signal in accordance with the invention.

In FIG. 1, a luminance signal Y is recorded by the frequency modulation of the picture carrier BT. The frequency modulation covers the range of 5.4 megahertz for sync tip level of the luminance signal to 7.0 megahertz for peak white level. For the frequency modulated luminance signal YFM, the total frequency spectrum 10 extends from around 1.6 megahertz to 8.0 or 9.0 megahertz, taking into account luminance channel filtering and magnetic tape frequency response. Two sound carriers T1 and T2, having the frequencies 1.4 and 1.8 megahertz, respectively, are recorded below frequency spectrum 10 by conventional means of e.g. depth multiplexing. The two sound carriers are modulated in a conventional manner with two sound signals from different sources or with stereo components from a single source.

Below frequency spectrum 10 there is a free frequency band 1 extending from 0-1.2 megahertz. In accordance with an inventive feature, in this free frequency range, from 0.08 megahertz-1.2 megahertz, a single sideband signal SSB is recorded. Single sideband signal SSB may comprise a line sequential color signal Fs which on alternate lines represents the modulated color difference carrier signals Fu and Fv. These signals are generated by modulation of respective color difference signals U and V onto a color carrier with subsequent suppression of the upper sideband and the color carrier frequency. Per line, this means that only one of the two color difference signals, U or V is recorded.

Figure 2:
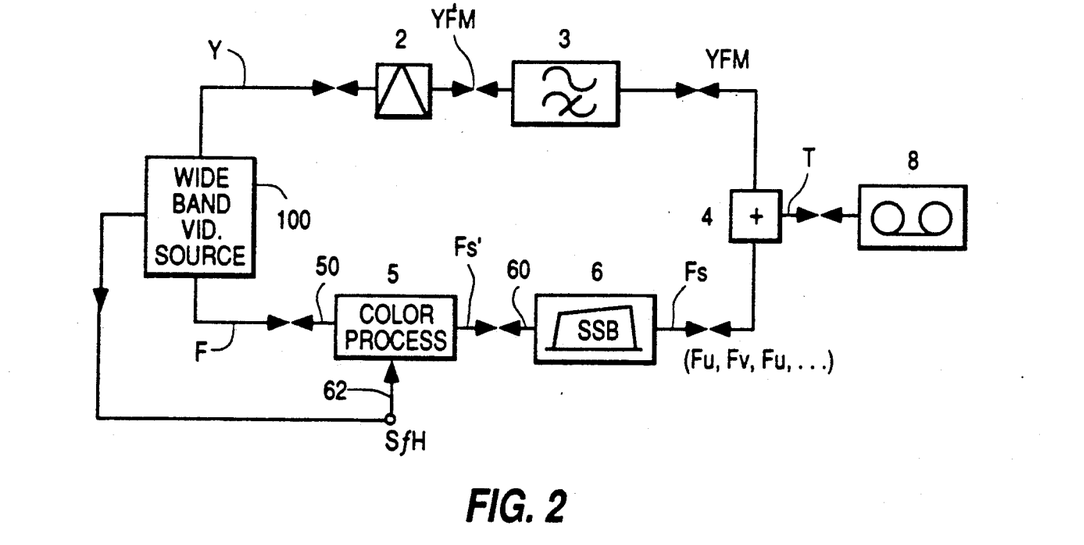
FIG. 2 illustrates in block diagram form a recording system embodying the invention.

In FIG. 2 there is illustrated video recording circuitry embodying the invention that records a composite color signal having the frequency spectrum of the combined spectrums 1 and 10 of FIG. 1. A wideband luminance signal Y, conventionally derived from a wideband video source 100, is modulated in a frequency modulator 2 with a picture carrier BT. The frequency modulated output YFM is passed through a high pass filter 3, with a cutoff frequency of around 1.6 megahertz, to produce the frequency spectrum 10 of FIG. 1. The YFM signal at the output of low pass filter 3 is coupled to an input of a signal combiner, adder stage 4.

A line sequential color signal Fs, having frequency spectrum 1 of FIG. 1 is coupled to another input of adder 4. The combined luminance and color signal T at the output of adder 4 is coupled to the transducer head arrangement of a videotape recorder 8, via record electronics not illustrated in FIG. 2.

To generate the single sideband color signal Fs coupled to adder 4, a modulated color carrier signal F on a signal line 50 is coupled to a color processor 5 for generating line sequential modulated color difference signal $F's = F'u, F'v, F'u \ldots$. The carrier frequency of the modulated color difference signals F'u and F'v is around 1.2 megahertz. The output of color processor 5 on a signal line 60 is coupled to a filter having the filter characteristics that produce the single sideband spectrum 1 of FIG. 1. The resulting single sideband modulated color difference signal $Fs = Fu, Fv, Fu, \ldots$ is coupled to adder 4 for recording by videotape recorder 8 in recorded tracks on magnetic tape.

Figure 10:
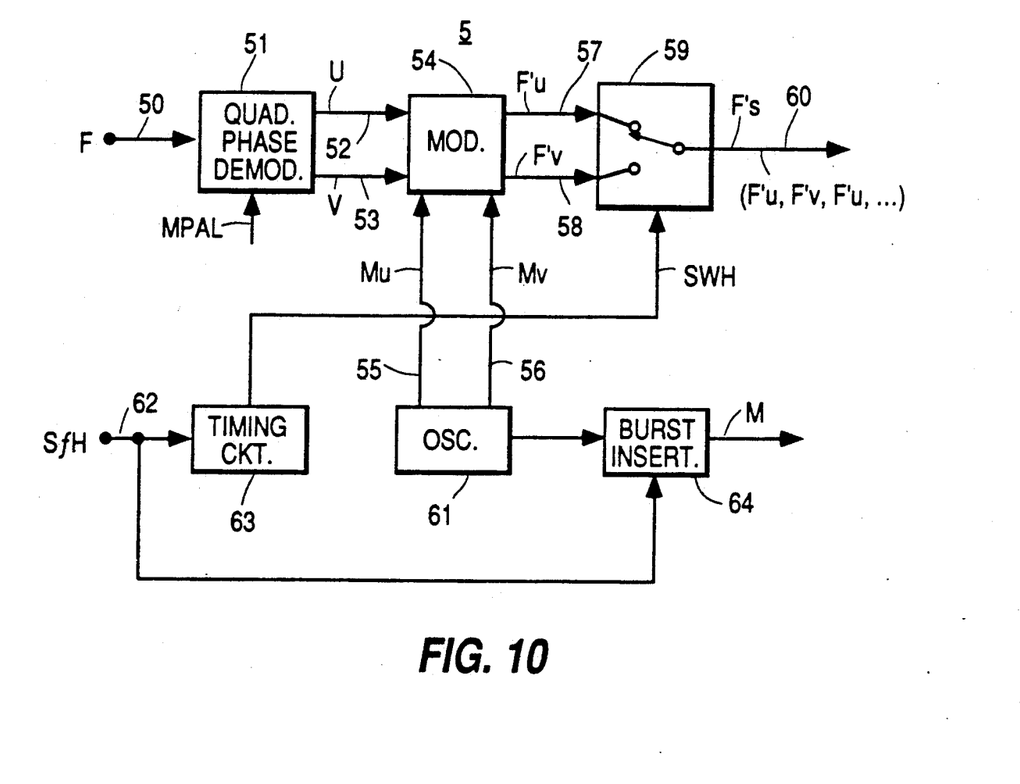
FIG. 10 illustrates in block diagram form a detailed embodiment of the line sequential frequency translating stage of the circuitry of FIG. 2.

A detailed embodiment of color processor 5 is illustrated in FIG. 10. The modulated color carrier signal F may comprise, for example, quadrature modulated color difference signals U and V, quadrature modulated in accordance with the PAL format.

Quadrature modulated color signal F is coupled to a demodulator 51 as is a PAL color carrier MPAL to generate the baseband U and V color difference signals on signal lines 52 and 53 respectively. The U and V baseband color difference signals are remodulated in a modulator 54 by mixing these signals with mixing carriers Mu and Mv respectively, developed on signal lines 55 and 56 by an oscillator 61. The remodulation process generates on output signal lines 57 and 58 modulated color difference signals F'u and F'v that are coupled to inputs of a line sequential switch 59.

Line sequential switch 59 is operated at the horizontal rate fH by a switching signal SWH. Signal SWH is generated by a timing circuit 63 that is controlled by horizontal synchronizing pulses SfH developed on a signal line 62. Modulated color difference signals F'u and F'v are line sequentially switched to output signal line 60 in accordance with switching signal SWH, to generate a line sequential color difference signal F's that is coupled to single sideband filter 6 of FIG. 2. The carrier frequency of each of mixing carriers Mu and Mv is around 1.2 megahertz. Thus the line sequential output F'u, F'v, F'u, . . . , has the required single sideband frequency spectrum 1 of FIG. 1.

Because the line sequential color signals Fu and Fv are single sideband signals without carrier frequency, a color synchronizing signal is also recorded during the horizontal blanking time to permit regeneration of the carriers and accurate retranslation of frequencies during playback and to provide ACC during both playback and record. To generate the color synchronizing signal, an output of color oscillator 61 is coupled to a burst inserter 64 that generates the color burst subcarrier M during horizontal blanking. Burst subcarrier M is inserted in the line sequential color signal downstream of filter 6 of FIG. 2 in a conventional manner not illustrated in FIG. 2.

The operation of oscillator 61 is synchronized with the line synchronizing pulses SfH to generate the various carriers Mu, Mv, and burst subcarrier M. In particular, each of the carriers may have the same frequency such that the common frequency is an integer multiple of the line frequency fH. To provide for reduced crosstalk pickup from adjacent recorded tracks, mixing carriers Mu and Mv may be in anti-phase relationship to each other resulting in the modulated color difference signals F'u and F'v also having an anti-phase relationship to each other. Burst subcarrier M also line sequentially alternates between Mu and Mv. When a line of modulated color difference signal F'u is being recorded, the phase of the recorded subcarrier burst is that of subcarrier Mu, and when a line of modulated color difference signal F'v is being recorded, the phase of the recorded subcarrier burst is that of Mv.

An alternative frequency selection criterion for mixing carriers Mu and Mv is to offset the frequency of carrier Mu by one half line period frequency with respect to the frequency of carrier Mv, with the frequencies of both carriers being around 1.2 megahertz. Thus Mu equals $Mv \pm fH/2$. By this offset of the two frequencies, the separation of the two signals during playback may be improved. Again, the burst of carrier M is line sequentially alternated in a sychronized manner between carriers Mu and Mv.

Figure 9:
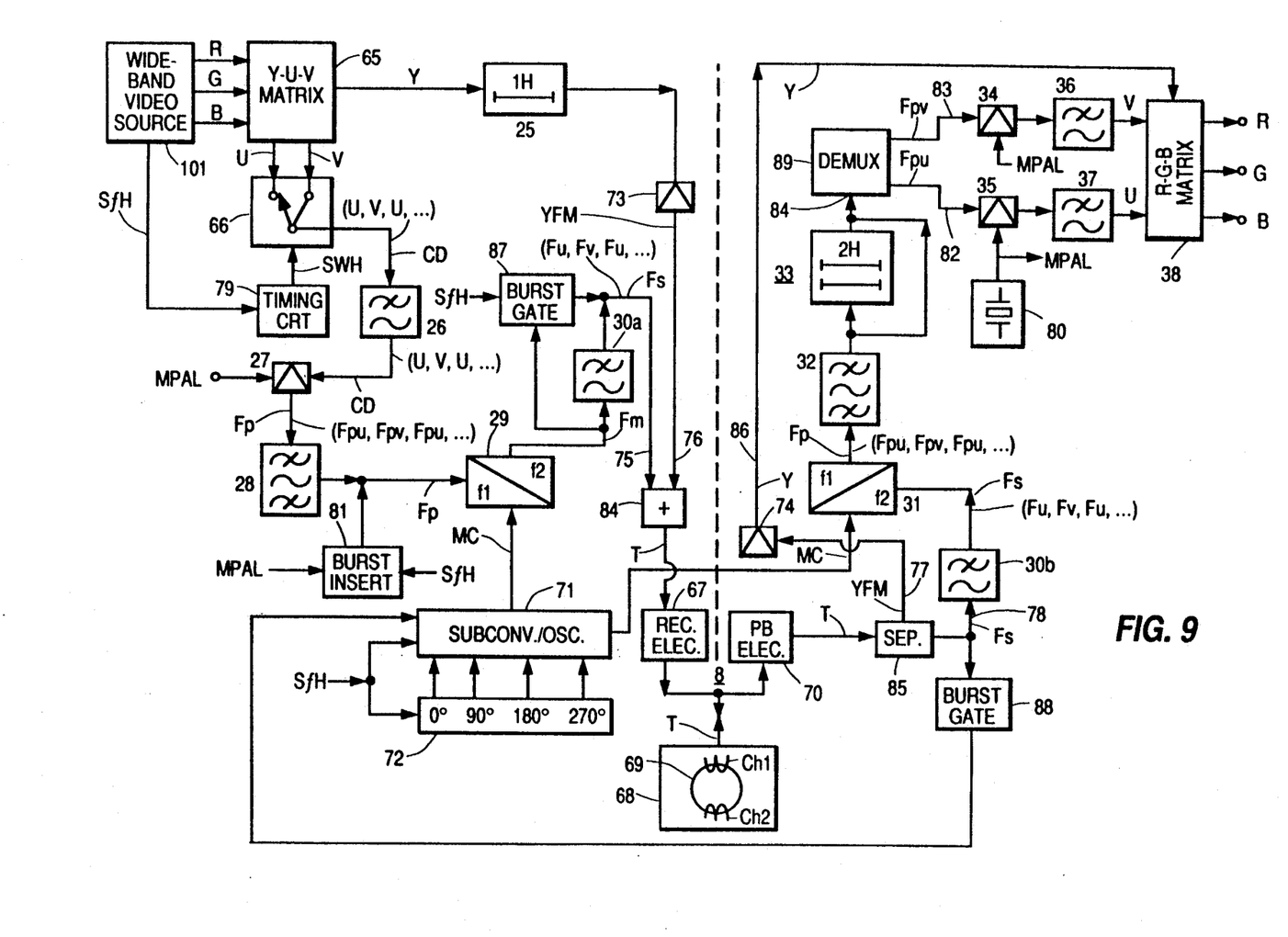
FIG. 9 illustrate in block diagram form recording and playback circuitry in accordance with a single sideband technique embodying the invention.

FIG. 9 illustrates recording and playback circuitry in accordance with a single sideband modulation technique embodying the invention. In FIG. 9, wideband R, G, and B signals, derived from a wideband video source 101 such as a high definition color camera, are coupled to a matrix 65 to generate on separate signal lines wideband Y, U, and V signals. Luminance signal Y may have bandwidth of, e.g., 0-5 megahertz, similar to the luminance bandwidth in an S-VHS system. The U and V signals each have a bandwidth of, e.g., 0-1 megahertz.

Luminance signal Y is delayed by an integer number of line periods, e.g. by a 1 H line period, using a 1 H delay line stage 25. The delayed luminance signal is then coupled to a frequency modulator 73 to generate on a signal line 76 a frequency modulated signal YFM having the frequency spectrum 10 of FIG. 1. Delay stage 25 is used in order to provide better time corelationship with the color signal that is to be recorded.

Frequency modulated signal YFM and a modulatd color signal Fs, developed on a signal line 75 in a manner to be described later, are coupled to an adder 84. The combined luma-chroma video signal T at the output of adder 84 is coupled to the record electronics 67 of a videotape recorder 8.

In videotape recorder 8, record electronics 67 applies the combined video signal T to a tranducer arrangement 68 for recording in oblique or helically scan tracks on a magnetic tape, in accordance with a conventional recording track format such as VHS recording track format. Record electronic 67, and playback electronics 70 used during playback, condition transucer arrangement 68 to properly record and playback combined video signal T.

Transducer arrangement 68 includes conventional recording mechanisms such as a scanner 69, around which the magnetic tape is wrapped, and the two transducer heads, Channel 1 and Channel 2, located 180 degree apart on the upper drum of the scanner. Not shown in FIG. 9 are other conventional videotape recorder elements, such as the tape transport mechanism and the capstan and headwheel drives, that are needed to enable the Channel 1 and Channel 2 transducer heads to scan helical tracks on the magnetic tape.

Playback electronics 70 receives the combined video signal T that is transduced by transducer arrangement 68 during playback and couples the playback signal to a separator 85 which separates the combined signal into its luminance and color components, on signal lines 77 and 78 respectively. The separated, frequency modulated luminance signal YFM on line 77 is frequency demodulated in conventional manner in a frequency demodulator 74 to regenerate the wideband baseband luminance signal Y at the output of the demodulator on a signal line 86.

In accordance with an aspect of the invention, a single sideband modulation technique is used to record and play back the color information component generated by the video source 101. The baseband color difference signals U and V at the output of matrix 65 is coupled to a line sequential switch 66, which is switched at a line rate by a switching signal SWH generated in a timing circuit 79 that is synchronized by horizontal sync pulses SfH obtained from video source 101. The line sequential color difference signal CD=U, V, U, ..., at the output of line sequential switch 66, is filtered by a low pass filter 26 having a cutoff frequency of e.g. 1.2 megahertz.

The line sequential output of filter 26 is coupled to a conventional amplitude modulator 27 for modulating the line sequential color difference signal CD with a PAL frequency carrier MPAL, generated by a crystal oscillator 80, to produce an amplitude modulated color difference signal Fp that line sequentially alternates between the U modulated color difference signal Fpu and the V modulated color difference signal Fpv.

Modulated color difference signal Fp is bandpass filtered by a filter 28 having a pass frequency of, e.g., 4.43±1.1 megahertz. The line sequential, modulated color difference signal Fp at the output of bandpass filter 28 is frequency downconverted in a main frequency converter 29, which mixes signal Fp with a mixing carrier MC of, e.g., 5.56 megahertz frequency. Frequency converter 29 frequency translates the modulated color difference signal Fp from a frequency f1 of 4.43 megahertz down to a frequency f2 of 1.13 megahertz, to generate at the output of the frequency converter a line sequential, modulated color difference signal Fm.

Downconverted signal Fm is low pass filtered by a filter 30a having a cutoff frequency of 1.2 megahertz, to generate line sequential, modulated color difference signal Fs that alternates on a line-by-line basis between a U modulated color difference signal Fu and a V modulated color difference signal Fv.

Low pass filter 30a removes the carrier frequency and upper sideband of signal Fm to produce a single sideband modulated line sequential color difference signal Fs having the frequency spectrum 1 of FIG. 1. A burst gate 87 takes modulated signal Fn before filtering by filter 30a and reinserts the downconverted subcarrier burst into signal Fs, at the filter output. Single sideband modulated color difference signal Fs is then coupled via adder 84 to record electronic 67 of videotape recorder 8 for recording in oblique tracks on magnetic tape.

To provide crosstalk pickup cancellation during playback, mixing carrier MC used during record undergoes a −90° phase rotation during successive line periods in a conventional manner similar to the phase rotation undergone by the mixing carrier in a conventional PAL VHS system. Mixing carrier MC is generated in a subconverter/oscillator 71 that is frequency and phase synchronized by horizontal sync pulse SfH. A phase shifting circuit 72, of conventional design, provides the required 90° phase rotation of mixing carrier MC.

To take advantage of the phase rotation principle for crosstalk cancellation, the modulation of the line sequential baseband color difference signal CD by the PAL frequency modulator MPAL is such as to produce a line sequential modulated color difference signal Fp where the line-sequential U modulated color difference signal Fpu is in anti-phase with the line-sequential V modulated color difference signal Fpv. A burst inserter 81, responsive to horizontal synchronizing pulse SfH, inserts a burst subcarrier during horizontal blanking. The burst subcarrier is phase and frequency synchronous, on a line-by-line basis, with the phase and frequency of the modulated subcarrier signals Fpu and Fpv.

During playback, playback electronics 70 is activated and receives the combined video signal T that is transduced from the recorded oblique tracks by the Channel 1 and Channel 2 transducer heads of transducer arrangement 68. Combined signal T is coupled to separator 85 which separates the signal into its frequency modulated luminance signal component YFM on signal line 77 and its single sideband line sequential, modulated color difference signal Fs on signal line 78. As previously mentioned, frequency modulated luminance signal YFM is demodulated in a frequency demodulator 74 to generate the wideband baseband luminance signal Y.

Single sideband modulated color signal Fs is lowpass filtered by a lowpass filter 30b that has filter characterics matching that of lowpass filter 30a used during record, to generate a filtered single sideband modulated color difference signal Fs having the single sideband frequency spectrum 1 of FIG. 1. Signal Fs line sequentially alternates between the U modulated color difference signal Fu and the V modulated color difference signal Fv.

Signal Fs is mixed with mixing carrier MC in a main frequency converter 31. Playback mixing carrier MC, e.g. of the same 5.56 megahertz frequency as in record, is generated by subconverter/oscillator 71. The 90° phase rotation used for crosstalk cancellation purposes is generated by phase shifter 72, but is generated with the opposite rotational sense of the rotation imparted during record, namely with a +90° phase rotation per line. A burst gate 88 separates out the playback subcarrier burst and applies it to subcarrier/oscillator 71 to provide, in conjunction with playback horizontal sync pulse SfH, conventional time base correction to mixing carrier MC.

The frequency of mixing carrier MC may be selected as being an integer multiple of ⅝ the frequency fH. Selection of such a frequency for mixing carrier MC has the advantage of reducing the visibility of any residual amount of mixing carrier MC, its hermonics, or its intermodulation products.

Main frequency converter 31 upconverts modulated color difference signal Fs from a frequency f2 of 1.13 megahertz to the PAL frequency f1 of 4.43 megahertz, to generate the line sequential modulated color difference signal Fp that line sequentially alternates between the U modulated color difference signal Fpu and the V modulated color difference signal Fpv. The upconverted, modulated color difference signal Fp is bandpass filtered by a filter 32 having a bandpass range of 1.2 megahertz between the limits of 4.43-5.63 megahertz.

To remove crosstalk pickup from adjacent recorded tracks, filtered modulated color difference signal Fp is coupled to a 2 H comb filter 33. The comb filtered, line sequential modulated color difference signal Fp is then coupled to an input 84 of a demultiplexer 89 which simultaneously generates modulated color difference signal Fpu on signal line 82 and modulated color difference signal Fpv on signal line 83. Each of modulated signals Fpu and Fpv are demodulated in a respective ring modulators 34 and 35 by PAL carrier MPAL, low pass filtered by respective filters 36 and 37 having cutoff frequencies in the neighborhood of 1.2 megahertz, to generate wideband U and V video signals. The Y, U and V signals are coupled to a matrix 38 to generate wideband R, G, and B video signals on separate signal lines. The wideband R, G, B video signals may be coupled to the RGB inputs of a high resolution monitor to produce a high resolution picture derived from the picture information contained in the wideband R, G, B signals.

Figure 8:
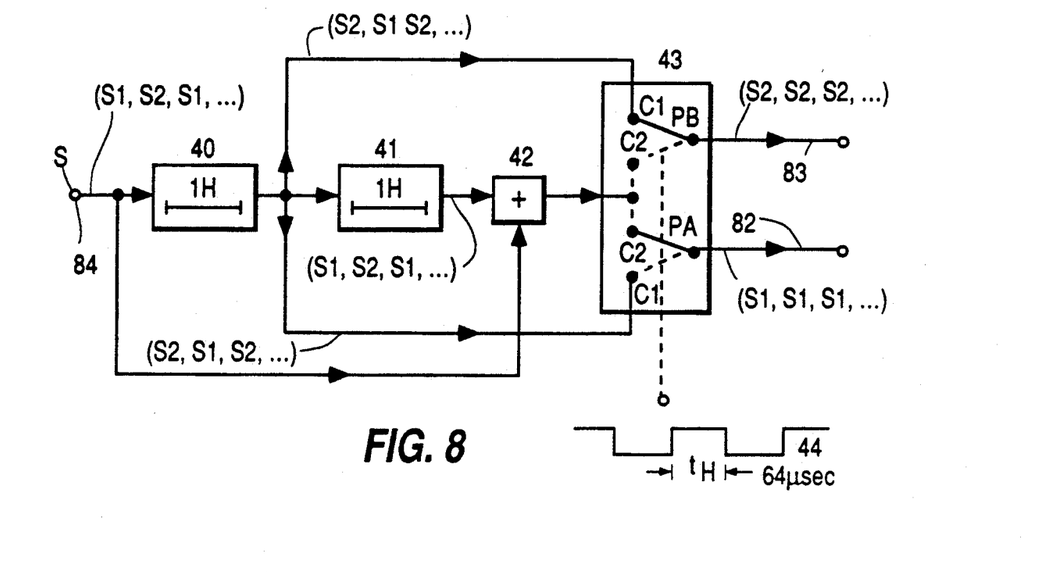
FIG. 8 illustrates in block diagram form circuitry for converting lines sequential signals into separated signals on separate signal lines.

FIG. 8 illustrates a detailed embodiment of a demultiplexer which may be used as demultiplexer 89 of FIG. 9 to simultaneously generate signals S1 and S2 on separate signal lines from line sequential input signal S and a single signal line. In FIG. 8, two 1 H line-delay stages 40 and 41 are used. An adder stage 42 receives the undelayed and the 2 H delayed signal S. The output of adder 42 is coupled to the C2 contact terminals of a double-pole double-throw switch 43. The 1 H delayed signal S at the output of delay 40 is coupled to the C1 contact terminals.

Double-pole double-throw switch 43 is operated at the line rate $1/t_H$ by a line rate switching signal 44, conventionally derived and synchronized with the line sequential alternation of signal S. The separated or demultiplexed output signals S1 and S2 are generated at respective poles PA and PB of switch 43. Delay stages 40 and 41 in conjunction with the switching operation of switch 43 repeats a line of a given signal S1 or S2 during its respective deadtime when the other signal is being generated.

When signals S1 and S2 are the baseband U and V signals, adder stage 42 averages a U or V signal with its two-line delayed predecessor. This averaging produces a post-filtering effect and tends to suppress interference in the picture which, for certain picture scenes, could occur due to the sequential signal transmission technique used. If signal averaging is not needed, 1 H delay 40 and adder 42 may be omitted.

Figure 3A:
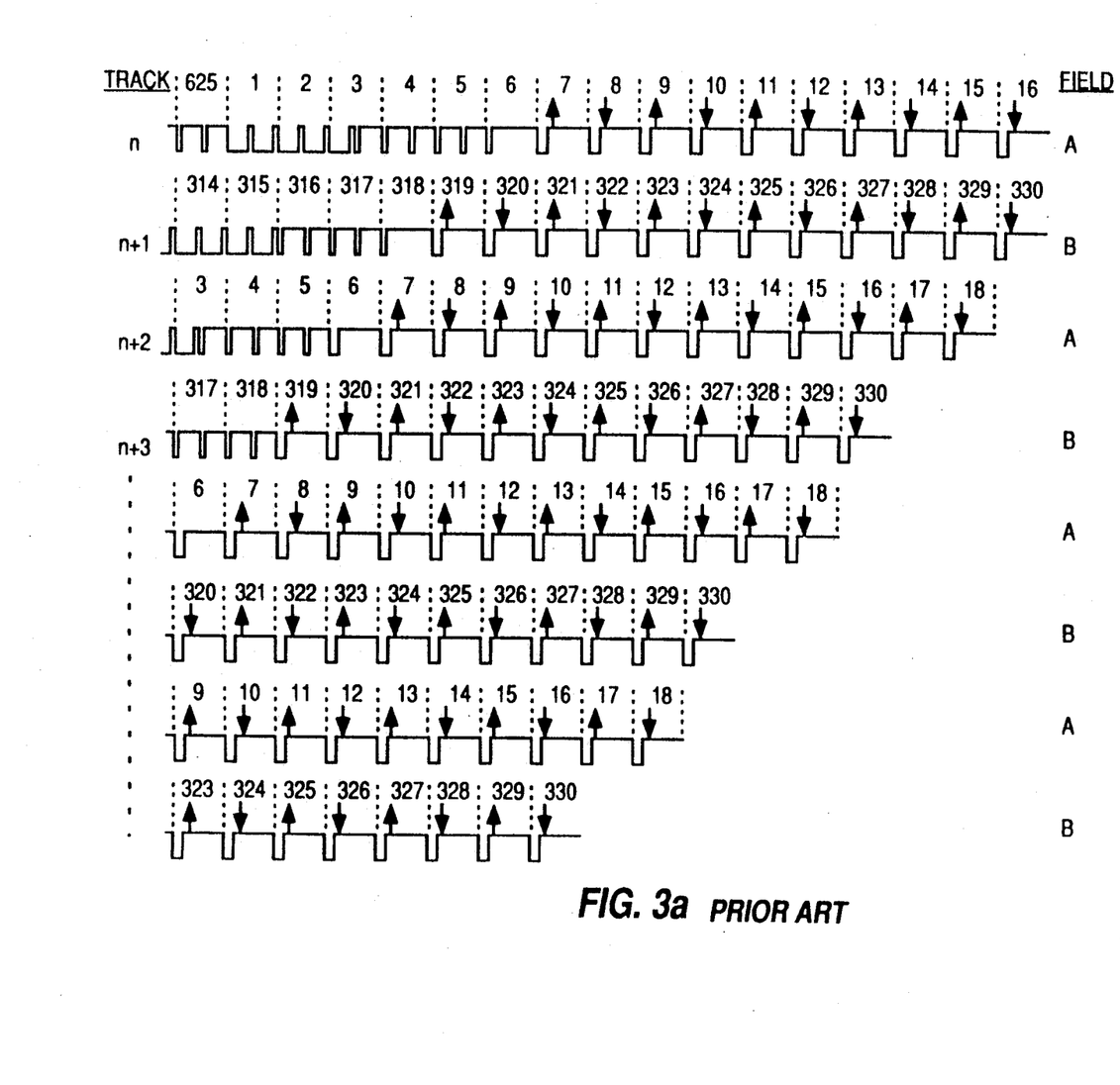
FIG. 3a illustrates in schematic form the position of recorded lines in adjacent tracks of a video signal recorded on a magnetic tape in accordance with a conventional helical scan recording technique.
Figure 3B:
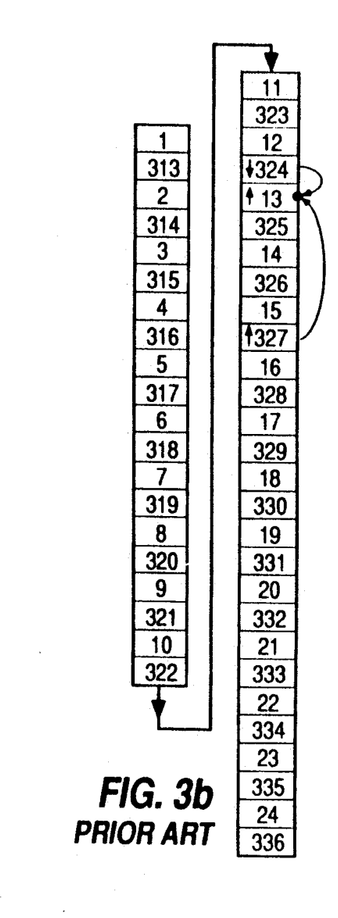
Figure 3C:
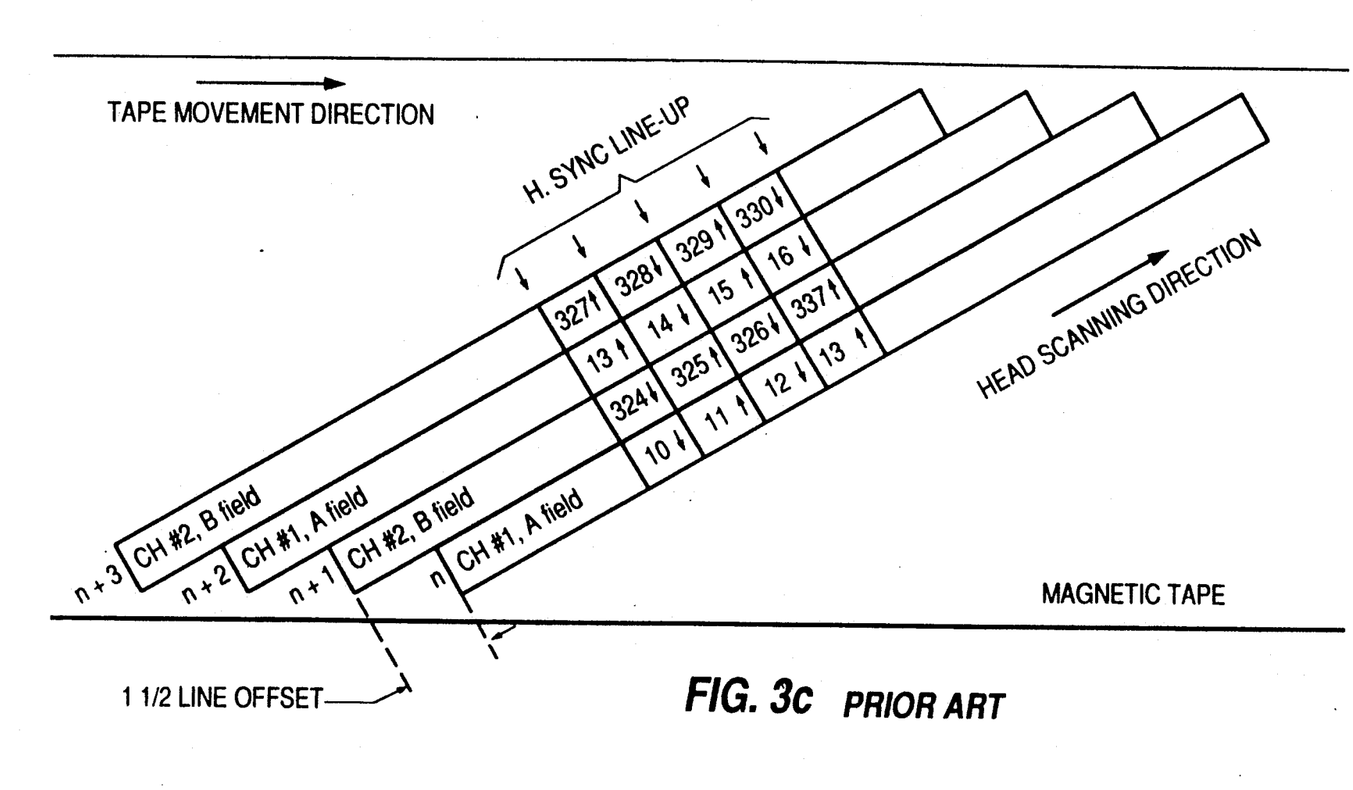

FIG. 3c illustrates the positioning of recorded lines in adjacent oblique magnetic tracks of a helically scanned videotape recorder having a track format similar to, e.g., a VHS standard track format. Four neighboring tracks successively scanned by the transducer headwheel are shown. Tracks n and n+2 are transduced by the Channel 1 head and contain the recorded lines of the A field of successively recorded picture frames. Tracks n+1 and n+3 are transduced by the Channel 2 head and contain the recorded lines of the interlacing B field of successively recorded picture frames. As is the conventional practice, adjacent recorded tracks are offset from each other by 1½ lines, as established by appropriate selection of track angle and linear tape speed for a given track pitch. The 1½ line offset between adjacent tracks produces H-correlation or horizontal sync pulse lineup between adjoining recorded lines in neighboring tracks.

FIG. 3a provides a different way of schematically representing the recorded line pattern of the oblique tracks of FIG. 3c, with each recorded line being numbered in accordance with a numbering system that is similar to the numbering system in a standard video line numbering system that has a two field per frame, 625 line interlace. In FIG. 3a, the recorded tracks n, n+1, n+2, n+3, . . . are shown with recorded video lines near the beginning of their respective fields. Thus the beginning of line 1 in track n of FIG. 3a is the beginning of the serrated vertical sync pulse which is of 2.5 line period duration.

Because of the 1½ line offset between adjacent tracks, the adjoining line of the next adjacent track n+1 is line 315 of the interlaced B field. As shown schematically in FIG. 3a, adjoining line 315 is located directly below line 1. The next track n+2, containing the recorded lines of the even, A field of the next successive frame, is offset by 3 lines from the lines of the first track n. Thus the adjoining line below line 315 is line 4 of track n+2.

The waveform wavetrain in each of the tracks illustrated in FIG. 3a schematically represents the picture information content of the Y luminance component of, e.g., wideband video source 100 of FIG. 2. It should be understood that the waveform shown in FIG. 3a is that of the baseband luminance waveform even though in actuality the luminance component is recorded in frequency modulated form.

The video line numbering sequence shown in FIG. 3a bears a direct and distinct relationship to the picture information display line positioning on the viewing screen of a display device. Consider FIG. 3b, which shows the display line position after recording and playback of the picture information of video lines generated by video source 100. The display lines may be generated on the screen of a raster scanned picture tube where tricolor electron beams are deflected horizontally and vertically in an interlaced raster scanning pattern. If line 1 of the A field in a given frame is arbitrarily assigned the first display line location, then successive display lines contain the picture content of the video lines of video source 100 in the sequence shown in FIG. 3b. Thus line 313, which bridges the end of the A field and the beginning of the B field within a given frame, is located below line 1. The content of video line 2 is located in the display line below that of line 313, etc. It should be noted that for pedagogical convenience only, the first or top display line in FIG. 3b is shown as having the "content" of video line 1 and the next adjoining display line as containing the "content" of video line 313, etc. These lines, however, occur during the vertical blanking interval of video source 100 and are associated with vertical retrace of the electron beams in the picture tube. In reality, the first visible display line containing actual picture information content is a display line from video lines occurring 20 or more line periods after the beginning of a given field.

With respect to video lines of the color component of wideband video source 100 of FIG. 2, the modulated subcarrier associated with a given video line is schematically indicated in FIG. 3a as alternating, upwardly and downwardly pointing arrows. Thus, for example, an upwardly point arrow represents U color difference picture information and a downwardly pointing arrow represent V color difference picture information. When recorded on magnetic tape by the system of FIG. 2, the U and V picture information is recorded as a line sequential, single sideband modulated subcarrier having a frequency spectrum located in frequency band 1 of FIG. 1.

If line sequential phase inversion of the subcarrier signal is used, as was discussed with respect to subcarriers Mu and Mv of FIG. 10, then the upwardly pointing arrows in FIG. 3a represent the phase of the U modulated color difference signal Fu and the phase of its corresponding subcarrier burst, and the downwardly pointing arrows represent the inverted phase or 180° out-of-phase V modulated color difference subcarrier signal Fv and its corresponding subcarrier burst. In FIG. 3a, the upwardly pointing arrows for lines 7 and 319, for example, represent only the U burst subcarrier phase since no U picture information is being generated during vertical blanking. However, upwardly pointing arrows for video lines 20 or more line periods later than lines 7 or 319 represent the phase of both the burst subcarrier and the phase of the modulated subcarrier containing the chrominance picture information.

The burst blanking format chosen for the line sequential color recording system of FIG. 2, for example, is similar to that of the D2-MAC standard format rather than the PAL standard format. Thus, in the burst blanking format illustrated in FIG. 3a, burst blanking extends through video line 6 in the even fields and through video line 318 in the odd fields. The burst phase is then reset to the U burst subcarrier phase at the beginning of each frame in the first video line after the end of burst blanking. Therefore, in FIG. 3a, video line 7 in each field A is reset to the U subcarrier phase. This results in the first video line 319 after burst blanking in each field B also being of U subcarrier phase.

Now consider the results of color crosstalk pickup when scanning the recorded tracks of FIG. 3a or 3c, where, due to the 1½ line offset between adjacent tracks, the recorded video line number pattern for adjoining recorded lines is as shown. When the tranducer head of Channel 1, for example, scans recorded track n+2, for example, recorded video lines ..., 13, 14, 15, 16, ... are sequentially transduced. Because the video head is typically wider than the width of the track it transduces, pickup of color signals from adjacent tracks n+1 and n+3 will occur. Thus the transduced signal of video line 13, for example, will include crosstalk color signals derived from adjoining recorded lines 324 and 327.

Even if comb filtering crosstalk cancellation techniques are used during playback, a certain amount of crosstalk interference will remain uncancelled and will be displayed on the viewing screen of the display device together with desired color picture information. This situation is shown schematically in FIG. 3b. The color picture information of video line 13 that is transduced by the channel 1 head when reading recorded track n+2 of FIG. 3c, is displayed in a display line location 13 of FIG. 3b as indicated by the black dot next to display line 13. Simultaneously transduced, and thus simultaneously displayed in display line location 13 is the crosstalk color picture information from adjoining lines 324 and 327 of FIG. 3c. The crosstalk display of color picture information is schematically indicated in FIG. 3b by the curved arrows pointing to display line 13 from each of display line locations 324 and 327.

The crosstalk picture information derived from lower display line 327, is the picture information that is spatially separated by five display lines from the correct color picture information of display line 13. The crosstalk picture information derived from upper display line 324 is crosstalk that originates from the next adjacent display line, a display line that is spatially much closer to display line 13.

The substantial inequality in separation distances of the upper and lower crosstalk display lines from the display line of interest, increases the visually disturbing effects of the crosstalk. The asymmetry in the relative locations of the two interferring crosstalk lines 324 and 327 relative to display line 13, exacerbates the perceived interference when compared to a situation where the interfering crosstalk lines are symmetrically located with respect to the display line of interest.

In accordance with a feature of the invention, the visual effects of crosstalk interference may be reduced by removing the asymmetry of spatial separation of the crosstalk lines. The crosstalk symmetrization is achieved by a time shift prior to recording of the video lines to be recorded in one track relative to the video lines to be recorded in an adjacent track. The time shifting of the video lines produces a rearranged recorded video line number pattern that symmetrizes the crosstalk pickup between adjoining recorded lines in adjacent tracks.

Figure 4A:
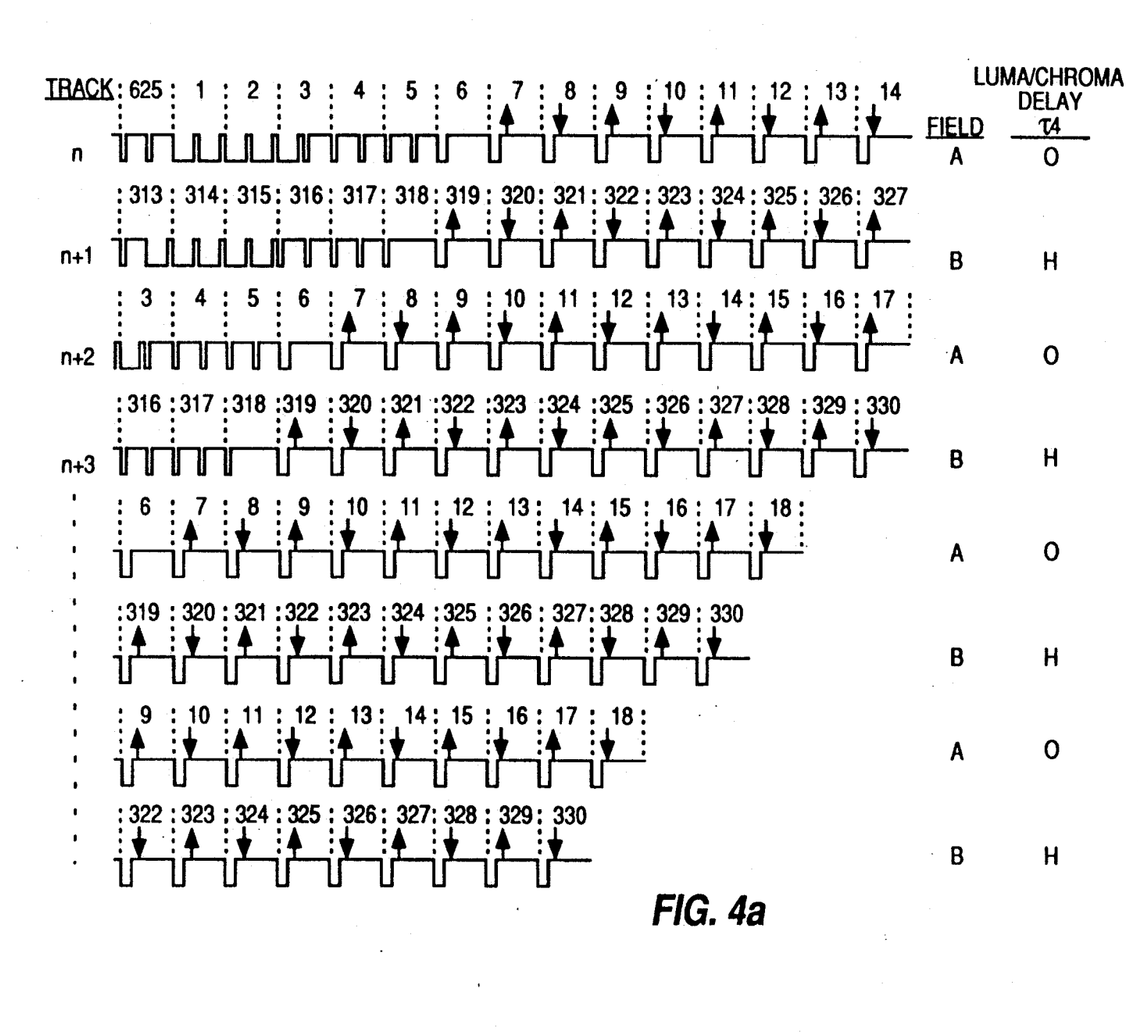
FIG. 4a illustrates in schematic form the position of recorded lines in adjacent tracks of a video signal recorded on a magnetic tape in accordance with an aspect of the invention.
Figure 4B:
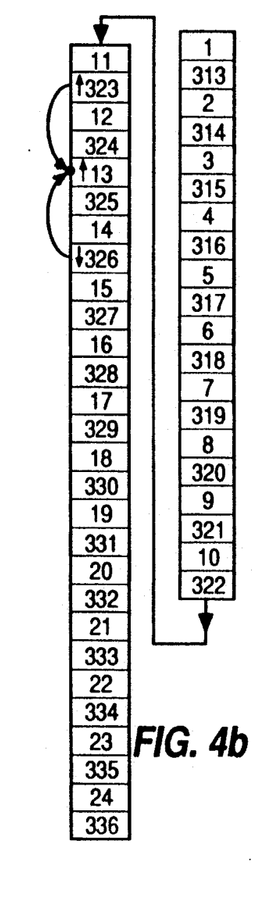

FIGS. 4a and 4b illustrate the results of a specific timeshifting sequence τ4, for symmetrizing crosstalk pickup to obtain the pattern of FIG. 4a, prior to recording, each line of the odd field B in a given frame is delayed by an amount equal to 1 H line period relative to each corresponding line of the even field A. Thus, when the Channel 1 transducer head reads recorded line 13 of track n+2, the adjoining crosstalk pickup lines are line 323 from track n+1 and line 326 from track n+3.

The display of the crosstalk pickup in display line location 13 is illustrated in FIG. 4b. Crosstalk pickup into display 13 is from picture information equally separated spatially by 3 lines, above and below. The symmetrizing of the spatial separation of the crosstalk reduces the prominence of the visual interference.

Figure 6:
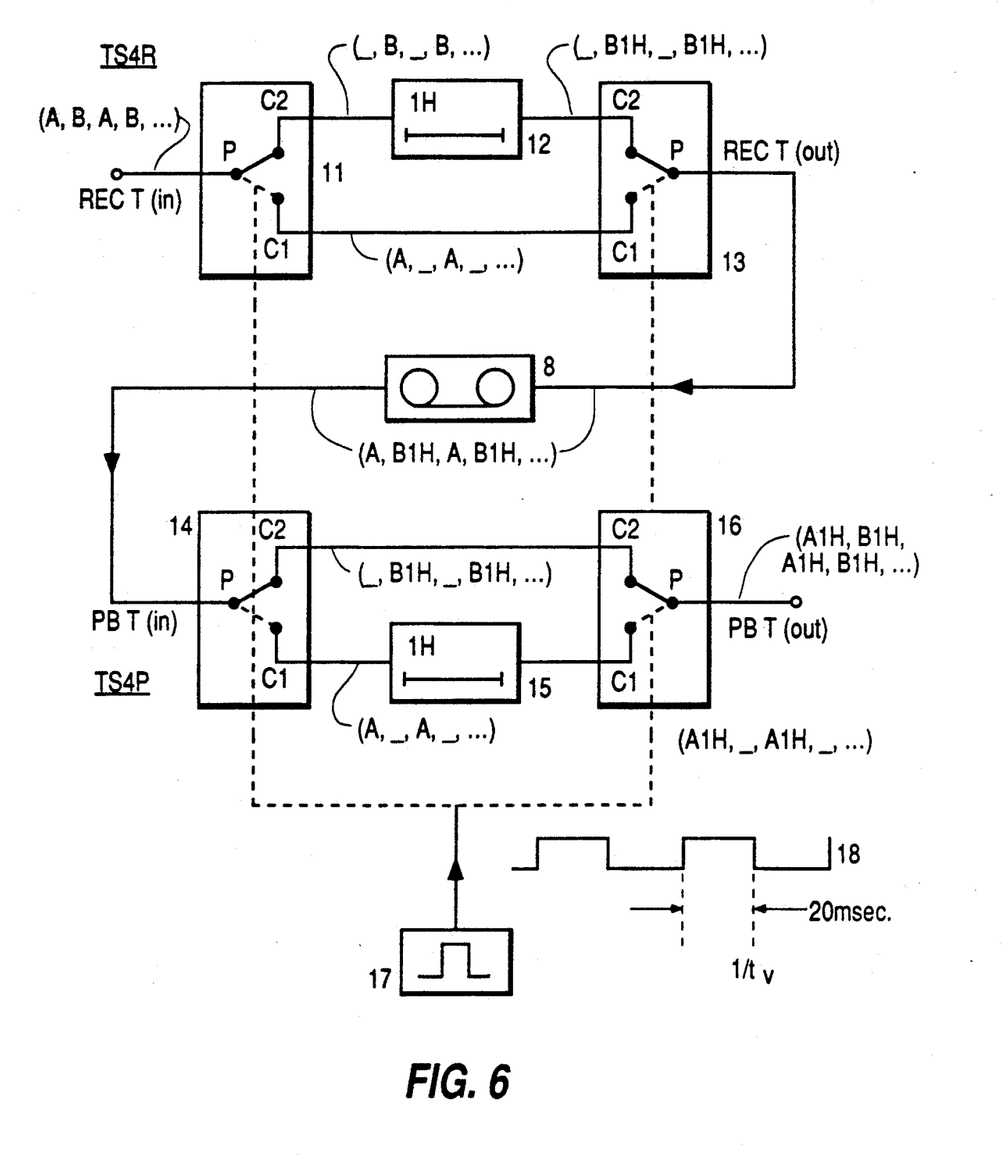

FIG. 6 illustrates a timeshifting circuit TS4R that will produce the timeshifting delay of 1 H line period to all the lines of the B field in each frame relative to the corresponding lines in the A field in that frame, thereby producing the rearranged recorded video line number pattern of FIG. 4a. FIG. 6 also illustrates a complementary timeshifting circuit TS4P that may be used during playback to restore the playback video signal line number sequencing to its original number sequence.

Timeshifting circuit TS4R may be inserted at any convenient point in the video processing chain of FIG. 2 prior to recording, such that the timeshifting is performed on both the luminance and chrominance components. A convenient point may be located, for example, between adder 4 of FIG. 2 and the record electronics of videotape recorder 8.

In FIG. 6, the combined luma-chroma signal T is coupled to a pole P of a single pole double throw switch 11. Contact terminal C1 of switch 11 is directly connected to contact terminal C1 of a single pole double throw switch 13. Contact terminal C2 of switch 11 is coupled to contact terminal C2 of switch 13 via a delay stage 12 of 1 H line period duration. The timeshifted T signal is obtained from pole P of switch 13. The timeshifted T signal is then passed to the record electronics of videotape recorder 8 to generate the recorded line number pattern of FIG. 4a.

In operation, switches 11 and 13 are synchronously switched at the field rate, $1/t_v$, by a switching signal 18 generated by a timing circuit 17 that is responsive to the synchronizing pulses in the T signal. Even fields A and odd fields B are alternately received at pole P of switch 11 during successive frames of the T signal. Because of the synchroneous field rate switching, contact terminals C1 of switches 11 and 13 only receive the A fields of the incoming T signal, whereas contact terminal C2 of switch 11 only receives the B fields.

Each video lines of each B field at contact terminal C2 of switch 11 is passed through 1 H delay 12, thereby producing at contact terminal C2 of switch 13 delayed fields B1H, where each line of a B1H field in a given frame is delayed by a 1 H line period relative to the corresponding line of the A field in that frame. The 1 H delayed B1H fields and the undelayed A fields are field-sequentially combined at pole P of switch 13, to reconstruct the T signal for recording in videotape recorder 8.

The timing relationship between the wiper arm position of each switch in FIG. 6 and switching signal 18 is as shown in the figure. During the high state of signal 18, the wiper arm of each switch is in the position indicated in solid-line, and during the low state of signal 18, the wiper arm of each switch is in the position indicated in dashed-line.

During playback, the playback T signal, derived from the playback electronics of videotape recorder 8, must undergo a complementary timeshifting to restored the original time relationship of the video lines in the B field of each frame relative to the corresponding video lines of the A field in that frame. To produce the complementary timeshifting, the playback T signal is coupled to timeshifting circuit TS4P that generates at its output playback T signal having the video lines of the A and B fields restored to their original time relationship. The time restored T signal, at the output of timeshifting circuit TS4P, may then be coupled to the right-hand side of the video processing circuitry of FIG. 2 to reconstruct the original Y and F signals.

During playback all the signal flow arrows of FIG. 2 are reversed in direction, and the record mode function of each of the blocks in FIG. 2 is replaced by the corresponding playback mode function. For example, block 4 becomes a luma-chroma separator instead of adder, block 2 becomes a frequency demodulator instead of a frequency modulator, and color processor 5 generates a quadrature modulated color difference signal F from line sequential modulated color difference signals F'u and F'v.

Returning to FIG. 6, in the playback mode of operation, timeshifting circuit TS4P receives playback T signal at pole P of a single pole double throw switch 14. Contact terminal C2 of switch 14 is directly coupled to contact terminal C2 of a single pole double throw switch 16. Contact terminal C1 of switch 14 is coupled to contact terminal C1 of switch 16 via a 1 H delay stage 15 of 1 H line period duration. Switches 14 and 16 are synchroneously operated at the field rate by switching signal 18.

Because of the timeshift provided by timeshifting circuit TS4R during record, the video lines of the playback B1H fields are 1 H delayed relative to the corresponding video lines of the playback A fields. To restore the original time relationship, delay stage 15 delays by a 1 H line period duration each video line of the playback A fields to produce at contact terminal C1 of switch 16 1 H delayed fields A1H corresponding to the 1 H delayed fields B1H that bypass delay stage stage 15 and that are coupled directly to contact terminal C2 of switch 16. The switching operation of switch 16 then recontructs the playback T signal, with the A and B fields restored to their original time relationship.

As previously mentioned, the 1 H delay of the video lines of the B fields relative to the video lines of the A fields produces in the recorded video line pattern of FIG. 4a and the symmetrical crosstalk display of FIG. 4b. The crosstalk, although being spatially symmetrical, introduces into a given display line crosstalk from both types of color difference signals. For example, display line 13 of FIG. 4b contains the desired U-type color difference signal from recorded video line 13 in track n+2 of FIG. 4a, the crosstalk of the U-type color difference signal picked up from recorded video line 323 in track n+1, and the crosstalk of the V-type color difference signal picked up from recorded video line 326 in track n+3.

Another way of reducing the visual impact of color crosstalk is to rearrange the recorded video line number pattern in such a manner as to produce crosstalk of the same-type color difference signal. Such a rearrangement is illustrated in FIG. 5a, where adjoining line crosstalk is of the same-type color difference signal, as evidenced by the fact that adjoining lines have arrows pointing in the same direction.

Figure 5A:
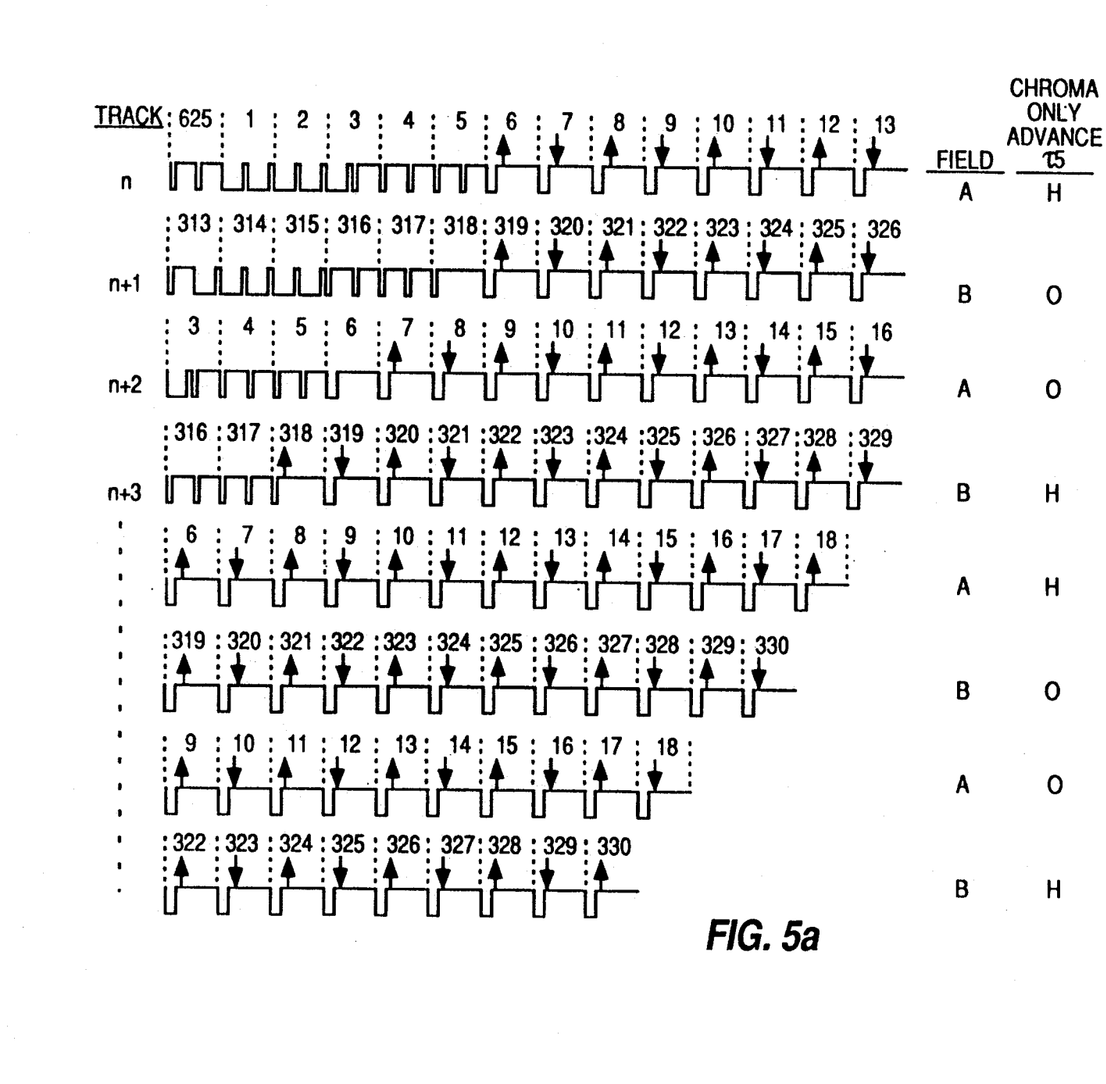
FIG. 5a illustrates in schematic form the position of recorded lines in adjacent tracks of a video signal recorded on a magnetic tape in accordance with another aspect of the invention.
Figure 5B:
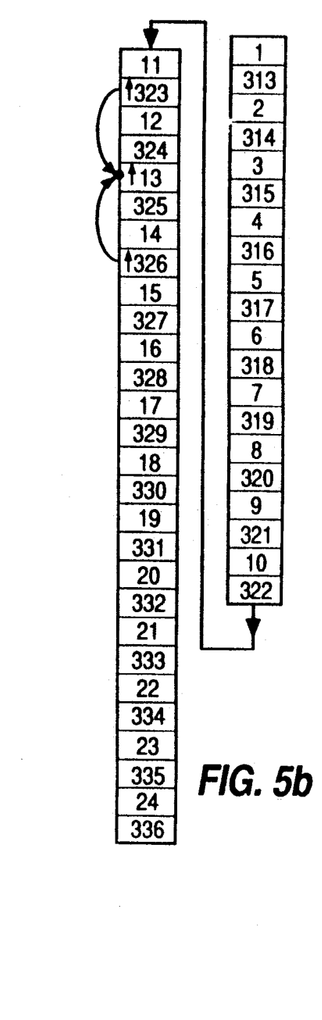

To produce the lineup of same-type color difference signals in adjoining lines, as shown in FIG. 5a, the combined luma-chroma T signal of FIG. 2 is timeshifted by delay circuit TS4R of FIG. 6, and additionally, the line sequential modulated color difference signal Fs is subjected to a further timeshifting of the A fields relative to the B fields of a given frame. As illustrated in FIG. 5a, a timeshifting sequence τ5 is performed in the chroma processing channel of FIG. 2. The timeshifting sequence results in all the video lines of an A field being advanced by a 1 H line period duration relative to the corresponding video lines of the B field in every other frame, e.g. in Frames 1, 3, . . . . . Whereas, in each of the alternate frames, e.g. in Frames 2, 4, . . . , all the video lines of the B field are advanced by a 1 H line period duration relative to the corresponding video lines of the A field. As a result of the two timeshifting sequences τ4 and τ5, the crosstalk displayed in a given display line is of the same type of color difference signal. The results of the two crosstalk sequences is illustrated by the crosstalk for display line location 13 of FIG. 5b, where the crosstalk into line 13 from adjoining lines 323 and 326 are both U-type color difference signal crosstalk.

To produce a recorded video line number pattern similar although not necessarily identical to that of FIG. 5a, having the same-type color difference signals in adjoining recorded lines, timeshifting circuit TS4R in FIG. 6 is inserted after the output of adder 4 of FIG. 2 to produce the aforementioned timeshifting sequence $\tau 4$ for the combined luma-chroma T signal. In addition, a timeshifting circuit TSCR of FIG. 7 is inserted in the chroma processing channel between the output of single sideband filter 6 and the chroma input to adder 4.

Timeshifting circuit TSCR includes a timeshifting circuit TS4R' identical in construction to timeshifting circuit TS4R of FIG. 6. It also includes a second timeshifting circuit TS5R in front of timeshifting circuit TS4R' for receiving the line sequential modulated color difference signal Fs of FIG. 2. Signal Fs is directly coupled to the input of a 1 H line delay stage 20 and to a contact terminal C1 of a single pole double throw switch 22. The output of 1 H delay 20 is coupled to a contact terminal C2 of switch 22. Pole P of switch 22 is directly coupled to the pole of switch 11 of timeshifting circuit TS4R'.

Figure 7:
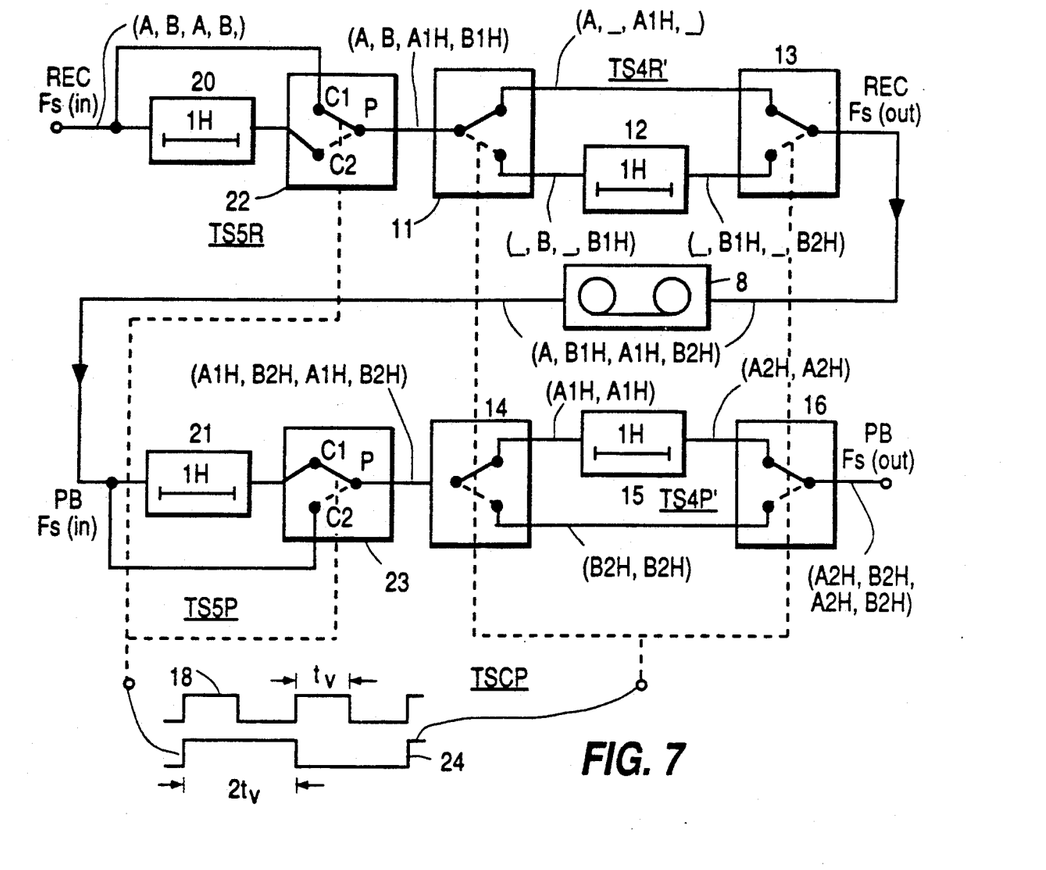

Switch 22 is operated at the frame rate, $1/2t_V$, by a switching signal 24 generated in a timing circuit not illustrated in FIG. 7 that is similar to timing circuit 17 of FIG. 6. During one frame time interval, when switching signal 24 is in the high state, pole P of switch 22 makes contact with its contact terminal C1, as indicated by the solid-line wiper arm position. During the next frame time interval, when switching signal 24 is in the low state, pole P makes contact with contact terminal C2, as indicated by the dashed-line wiper arm position. Switches 11 and 13 are synchronously operated at the field switching rate, $1/t_V$, by switching signal 18 in a manner similar to that described for the timeshifting circuit TS4R of FIG. 6.

The relationship of the wiper arm contact positions of switch 22 relative to the wiper arm contact positions of each of switches 11 and 13 is determined by the timing relationship between switching signal 24 and switching signal 18. This timing relationship is shown in FIG. 7.

By means of timeshifting circuit TSCR of FIG. 7, the line sequential modulated color difference signal Fs undergoes a timeshift from field-to-field and from frame-to-frame that produces the field sequence A, B1H, for Frame 1, and the field sequence A1H, B2H, for the next frame, Frame 2. Frame 3 repeats the sequence of Frame 1 and Frame 4 repeats the sequence of Frame 2, and so on. The symbols A1H and B1H indicate that each video lie in the respective field, A1H or B1H, has undergone a 1 H line period delay, e.g. by passing through delay 20 of FIG. 7. Similarly, the symbols A2H and B2H indicate that each video line in the respective field, A2H or B2H, has undergone a 2 H line period delay, e.g. by passing through both delays 20 and 12.

In playback, to restore the original time relationship between the A and B fields of successive frames, the playback combined video signal T undergoes a complementary timeshift by a circuit similar to circuit TS4P and the playback line sequential modulated color difference signal Fs undergoes a complementary timeshift by timeshifting circuit TSCP of FIG. 7. Timeshifting circuit TSCP includes a timeshifting stage TS4P' identical in construction to timeshifting circuit TS4P of FIG. 6. It also includes a second timeshifting circuit TS5P in front of timeshifting circuit TS4P', for receiving playback signal Fs at a junction terminal of the input to a 1 H line delay stage 21 and the contact terminal C2 of a single pole double throw switch 23. The output of delay stage 21 is coupled to contact terminal C1 of switch 23. Pole P of switch 23 is directly coupled to the pole of switch 14 of timeshifting circuit TS4P'.

Switch 23 is switched at the frame rate by switching signal 24, and switches 14 and 16 are switched at the field rate by switching signal 18. The wiper arm position timing relationships between the three switches is again shown in accordance with the timing relationship between switching signals 18 and 24, where the solid-line wiper arm positions are obtained during the high state of the respective switching signals 18 and 24, and the dashed-line wiper arm positions are obtained during the low state.

Playback timeshifting circuit TSCP takes the playback color signal Fs, having the two-frame field sequence A, B1H, A1H, B2H, and produces at its output a playback color signal Fs having the field sequence A2H, B2H, A2H, B2H. This field-sequence is equivalent to the original field sequence of signal Fs at the input of timeshifting circuit TSCR prior to recording.

The timeshifting sequence $\tau 5$ for the color difference signals of FIG. 5a was described in terms of signal advance of the video lines of one field relative to corresponding video lines of another field. In practice, the same effect is achieved by means of signal delay elements connected in the configuration shown in FIG. 7.

The timeshifting techniques just described with respect to FIGS. 4a and 5a, respectively produce symmetrically located crosstalk interference and crosstalk of the same-type color signal. These timeshifting techniques may also be advantageously used when processing signals other than line sequential color difference signals, e.g. when processing PAL, SECAM, or NTSC formatted signals.

What is claimed is:

1. Apparatus, comprising:
   a source of a luminance containing signal;
   means for frequency modulating said luminance containing signal with an FM carrier to generate a frequency modulated signal having a first frequency spectrum in a first frequency band;
   a source of a chrominance containing signal;
   means including a modulator for single sideband modulating said chrominance containing signal with a second carrier to generate a second modulated signal having a second frequency spectrum in the form of a single sideband to one side of said second carrier that is located in a second frequency band below said first frequency band in a region that is generally empty of frequencies belonging to said frequency modulated signal; and
   means for recording said frequency and second modulated signals on a magnetic tape.

2. Apparatus according to claim 1 wherein said second modulated signal generating means includes a filter for producing said second frequency spectrum, with the frequency of the second carrier being suppressed.

3. Apparatus according to claim 1 wherein said chrominance containing signal contains first and second color difference signals and said modulator modulates said first color difference signal with said second carrier and modulates said second color difference signal with a third carrier to generate said second modulated signal.

4. Apparatus according to claim 3 wherein said second and third carriers are offset in frequency by fH/2, where fH is the line frequency.

5. Apparatus according to claim 3 wherein said second modulated signal generating means includes a filter for producing said second frequency spectrum with the frequencies of the second and third carriers being suppressed.

6. Apparatus according to claim 1 including means for delaying said luminance containing signal relative to said chrominance containing signal by at least an integer number of lines to match chrominance signal delay prior to recording.

7. Apparatus according to claim 1 wherein said recording means includes a transducer arrangement for generating a plurality of recorded tracks on said magnetic tape and recording electronics coupled to said transducer arrangement and responsive to said second and frequency modulated signals for recording these signals in said recorded tracks.

8. Apparatus according to claim 7 wherein said source of chrominance containing signal comprises a source of a PAL format color signal, and said second modulated signal comprises first and second modulated color difference signals, and wherein said second modulated signal generating means includes a line sequential switch responsive to the two modulated color differences signals for generating said second modulated signal as a line sequential signal that alternates on a line-by-line basis between the two modulated color difference signals.

9. Apparatus according to claim 8 including playback electronics coupled to said transducer arrangement for generating a playback signal that includes a reproduced second modulated signal, means including a line delay responsive to said reproduced second modulated signal for generating reproduced first and second baseband color difference signals, such that each baseband color difference signal is repeated during its associated deadtime.

10. Apparatus according to claim 7 wherein said chrominance containing signal comprises line sequential first and second color difference signals and including means for time shifting said chrominance containing signal relative to said luminance containing signal to position recorded lines of said second modulated signal in said recorded tracks such that pickup by said transducer arrangement of a given recorded line of said second modulated signal in a given track and simultaneous crosstalk pickup by said transducer arrangement of a corresponding recorded line in an adjacent track result in the pickup from both the given and corresponding recorded lines of a recorded line of said second modulated signal that contains signal content relating to only one of the two color difference signals.

11. Apparatus according to claim 10 wherein said time shifting means time shifts each one of the chrominance and luminance containing signals such that each line of one of two fields in each frame of said each one signal is delayed by the duration of one line period relative to each corresponding line of the other field.

12. Apparatus according to claim 11 including playback electronics coupled to said transducer arrangement for generating a playback signal, means responsive to said playback signal for generating threrefrom a second luminance containing signal and a second chrominance containing signal, said playback signal responsive means including means for producing a complementary delay of one line period duration to each of the second luminance and chrominance containing signals such that in each frame, each line of that one of two fields that corresponds to the earlier-mentioned other one of two fields of the first-mentioned luminance and chrominance signals is delayed by one line period relative to each corresponding line of the other field of the second luminance and chrominance containing signals.

13. Apparatus according to claim 7 including playback electronics coupled to said transducer arrangement for generating a playback signal that is transduced from a given recorded track, said playback signal including a reproduced second modulated signal having a single sideband frequency spectrum, and further including a comb filter receiving said reproduced second modulated signal for generating a comb filtered signal with reduced crosstalk signal pickup from a recorded track adjacent to said given recorded track.

14. Apparatus according to claim 7 including playback electronics coupled to said transducer arrangement for simultaneously generating a playback signal that is transduced from a given recorded track and first and second crosstalk signals that are respectively transduced from two adjacent recorded tracks located on either side of said given recorded track, said apparatus further including means for producing a time shifting of at least one of said second and frequency modulated signals prior to recording so as to align a given recorded line in said given recorded track with first and second corresponding recorded lines of said two adjacent recorded tracks in such a manner that a given playback line of said playback signal and corresponding first and second simultaneously generated crosstalk lines of said first and second crosstalk signals respectively represent a first display line that is associated with a first location on a viewing screen of a display device and second and third display lines associated with second and third locations that are spatially separated from said first location, equally, above and below.

15. Apparatus according to claim 14 wherein said time shifting means produces a time shifting of both of said second and frequency modulated signals prior to recording such that each line of one of two fields in each frame of both signals is delayed by one line period relative to each corresponding line of the other field.

16. Apparatus according to claim 15 including means responsive to said playback signal for generating therefrom a second luminance containing signal and a second chrominance containing signal, said playback signal responsive means including means for producing a complementary delay of one line period to each of the second luminance and chrominance containing signals such that in each frame, each line of that one of two fields that corresponds to the earlier-mentioned other one of two fields of said both signals is delayed by one line period relative to each line of the other field of the second luminance and chrominance containing signals.

17. Apparatus according to claim 7 including playback electronics coupled to said transducer arrangement for generating a playback signal that includes a reproduced second modulated signal and reproduced line synchronizing pulses, means responsive to said reproduced line synchronizing pulses for generating a third carrier having a frequency that is an integer multiple of ⅝ the frequency of said reproduced line frequency pulses, and means including a demodulator coupled to said playback electronics for demodulating said reproduced second modulated with said third carrier to generate a demodulated chrominance containing signal that has a single sideband frequency spectrum.

18. Apparatus according to claim 1 including means for time shifting said chrominance and luminance containing signals prior to recording such that for each of the two just-mentioned signals, each line of one of two fields in each frame is delayed by a delay of one line period duration relative to each corresponding line of the other field.

19. Apparatus according to claim 18 wherein said recording means includes a transducer arrangement for generating a plurality of recorded tracks on said magnetic tape and recording electronics coupled to said transducer arrangement and responsive to said second and frequency modulated signals for recording the two just-mentioned signals in said recorded tracks.

20. Apparatus according to claim 19 including playback electronics coupled to said transducer arrangement for generating a playback signal, means responsive to said playback signal for generating threrefrom a second luminance containing signal and a second chrominance containing signal, said playback signal responsive means including means for producing a complementary delay of one line period duration to each of the second luminance and chrominance containing signals such that in each frame, each line of that one of two fields that corresponds to the earlier-mentioned other one of two fields of the first-mentioned luminance and chrominance signals is delayed by one line period relative to each corresponding line of the other field of the second luminance and chrominance containing signals.

21. Apparatus, comprising:
a source of a video information signal;
means for frequency modulating said video information signal with an FM carrier to generate a frequency modulated signal having a first frequency spectrum in a first frequency band;
a source of a second information signal;
means including a modulator for single sideband modulating said second information signal with a second carrier to generate a second modulated signal having a second frequency spectrum in the form of a single sideband to one side of said second carrier that is located in a second frequency band outside said first frequency band in a region that is generally empty of frequencies belonging to said frequency modulated signal; and
means for recording said frequency and second modulated signals on a magnetic tape.

* * * * *